United States Patent
Sung et al.

(10) Patent No.: US 8,559,572 B2
(45) Date of Patent: Oct. 15, 2013

(54) METHOD FOR INTERFERENCE CONTROL BY AN ULTRA-WIDEBAND WIRELESS COMMUNICATION SYSTEM IN A MULTI-USER ENVIRONMENT AND A RECEIVER FOR PERFORMING THE SAME

(75) Inventors: Dan Keun Sung, Daejeon (KR); Jo Woon Chong, Seoul (KR); Bang Chul Jung, Seoul (KR); Min Jeong Kim, Seoul (KR)

(73) Assignee: Pantech Co., Ltd., Seoul (KR)

( * ) Notice: Subject to any disclaimer, the term of this patent is extended or adjusted under 35 U.S.C. 154(b) by 0 days.

(21) Appl. No.: 13/342,360

(22) Filed: Jan. 3, 2012

(65) Prior Publication Data

US 2012/0099619 A1 Apr. 26, 2012

Related U.S. Application Data

(63) Continuation of application No. 11/733,342, filed on Apr. 10, 2007, now Pat. No. 8,102,952.

(30) Foreign Application Priority Data

Oct. 4, 2006 (KR) .......................... 10-2006-0097536

(51) Int. Cl.
 *H03D 1/04* (2006.01)
 *H04B 1/00* (2006.01)
(52) U.S. Cl.
 USPC .......................................... 375/346; 375/130
(58) Field of Classification Search
 USPC .............. 375/130, 343, 346, 340, 316
 See application file for complete search history.

(56) References Cited

U.S. PATENT DOCUMENTS

| | | | |
|---|---|---|---|
| 7,653,028 B2 * | 1/2010 | Shiu et al. | 370/335 |
| 2004/0122667 A1 | 6/2004 | Lee et al. | |
| 2004/0157561 A1 * | 8/2004 | Akerberg | 455/67.11 |
| 2005/0237966 A1 * | 10/2005 | Aiello et al. | 370/321 |
| 2006/0203936 A1 | 9/2006 | Roovers et al. | |
| 2006/0268959 A1 | 11/2006 | Kim et al. | |
| 2007/0053333 A1 | 3/2007 | Pragada | |
| 2007/0273607 A1 * | 11/2007 | Chen | 343/893 |

OTHER PUBLICATIONS

Kim et al., "Performance Enhancement of a TH-PPM UWB System Using a Near-Interference Erasure Scheme" -Ultra-Wideband, The 2006 IEEE 2006 International Conference on Sep. 2006, pp. 399-404, which was submitted in the U.S. Appl. No. 11/733,342.

(Continued)

*Primary Examiner* — Shuwang Liu
*Assistant Examiner* — Brian J Stevens
(74) *Attorney, Agent, or Firm* — H.C. Park & Associates, PLC

(57) ABSTRACT

An Ultra-Wideband (UWB) wireless communication system in a multi-user environment determines a threshold value to eliminate a signal pulse affected by a near-interference from among a plurality of signal pulses transmitted a number of times. A method for controlling an interference includes receiving the signal pulses, calculating a correlation value by applying a predetermined correlation mask to the signal pulses, determining a threshold value by referring to the number of times that the signal pulses are transmitted, a signal-to-interference-and-noise ratio, and information about a ratio of a near-interference to a far-interference, and eliminating signal pulses having a correlation value greater than the threshold value. The correlation values that are not greater than the threshold value are summed to detect a bit corresponding to each pulse signal.

3 Claims, 12 Drawing Sheets

(56) References Cited

OTHER PUBLICATIONS

Non-Final Office Action dated Jun. 7, 2010 in U.S. Appl. No. 11/733,342.
Final Office Action dated Nov. 18, 2010 in U.S. Appl. No. 11/733,342.
Non-Final Office Action dated Feb. 3, 2011 in U.S. Appl. No. 11/733,342.
Final Office Action dated Jul. 18, 2011 in U.S. Appl. No. 11/733,342.
Notice of Allowance Action dated Sep. 16, 2011 in U.S. Appl. No. 11/733,342.

* cited by examiner

METHOD FOR INTERFERENCE CONTROL BY AN ULTRA-WIDEBAND WIRELESS COMMUNICATION SYSTEM IN A MULTI-USER ENVIRONMENT AND A RECEIVER FOR PERFORMING THE SAME

CROSS-REFERENCE TO RELATED APPLICATION

This application is a continuation of U.S. patent application Ser. No. 11/733,342, filed on Apr. 10, 2007, which claims priority from and the benefit of Korean Patent Application No. 10-2006-0097536, filed on Oct. 4, 2006, all of which are hereby incorporated by reference for all purposes as if fully set forth herein.

BACKGROUND OF THE INVENTION

1. Field of the Invention

The present invention relates to an Ultra-Wideband (UWB) wireless communication system in a multi-user environment, and more particularly, to a UWB wireless communication system that can determine a threshold value to eliminate a signal pulse affected by a near-interference from among a plurality of received signal pulses.

2. Discussion of the Background

An Ultra-Wideband (UWB) technology can transmit data via a comparatively wide frequency band, and has been considered as a promising technology for a wireless personal area network (WPAN), which is generally used to exchange various types of data between two or more digital devices that are located within a short distance from each other.

A UWB wireless communication system uses a wide frequency band, which includes a commercially used frequency band. Thus, a method for receiving a plurality of signal pulses and estimating a bit value at a receiver by receiving a signal pulse corresponding to each bit a predetermined number of times is commonly used to reduce the interference that may affect signals transmitted in a commercially used frequency band.

As described above, since signal pulses are quickly transmitted for a comparatively very short time, it is very important to synchronize an originating transmitter and a target receiver. However, even when synchronized, a delay may occur in a multi-path wireless communication system.

Specifically, in a multi-user environment where the UWB wireless communication system includes a plurality of transceivers, a signal transmitted from an interfering transmitter other than the originating transmitter and received at a target receiver may act as an interference signal for the target receiver due to the failure of synchronization and the delay spread. Here, the interfering transmitter may be located closer to the target receiver than an originating transmitter that is transmitting the signal intended to be received by the target receiver. Also, since the interfering transmitter is located closer to the target receiver, an interference signal may have a greater effect on a bit decision than a signal transmitted from the originating transmitter. Accordingly, the above-described problem becomes more serious.

More specifically, an interference signal from the interfering transmitter located closer to a target receiver may have a greater received power than the received power of a signal from an originating transmitter. This is because received power of a signal is a function of a distance between the transmitter and the receiver. Thus, data from the originating transmitter may not be received by the target receiver. This is referred to as a near/far problem.

The near/far problem may occur in different wireless communication systems. To solve the near/far problem in a Code Division Multiple Access (CDMA) system, uplink data is transmitted at a varying power depending on a distance between the mobile stations and a base station. Therefore, a signal transmitted from the base station has a uniform received power at the mobile stations irrespective of the distance between the mobile stations and the base station.

However, even when an originating transmitter controls transmission power, an interference signal at a receiver, including a target receiver, may not be controlled. Thus, the above-described method of solving the near/far problem may not be applicable to the UWB wireless communication system in the multi-user environment.

Rather, studies to solve the far/near problem for the UWB wireless communication system in the multi-user environment have been classified generally into two schemes.

A first scheme is referred to as "spatial exclusion". Spatial exclusion divides the entire space into domains or exclusion regions surrounding the receivers. Near-interference from transmissions outside a domain may be ignored by a target receiver inside the domain. Then, scheduling is performed so that an originating transmitter does not transmit a signal when it is located within a domain of a receiver that is not the target receiver. Thus, the generation of near-interference may be reduced.

However, in spatial exclusion, a performance of the receiver is globally and locally affected by a domain radius from the receiver. For example, if the domain radius is too large, generation of near-interference may be significantly reduced, but transmissions may be hindered. Conversely, if the domain radius is too small, more simultaneous transmissions may occur at the expense of increased near-interference. Thus, the domain radius may not be simply defined. Also, when a transmitted/received power level is low, as in the UWB wireless communication system, the power of a signal may not be quickly measured. Accordingly, a Carrier Sense Multiple Access with Collision Avoidance (CSMA/CA) scheme for detecting signal transmission by another transmitter located within a domain to avoid a collision may not be applicable. Also, due to a domain management and scheduling between many links in a domain, a great amount of control overhead is necessary. This overhead can be prohibitively high for a UWB wireless communication system that operates with limited available resources.

A second scheme is referred to as a "temporal exclusion". Temporal exclusion divides a single frame into many time slots and performs scheduling so that a signal transmitted by an originating transmitter and a signal transmitted by an interfering transmitter are transmitted in different times slots.

However, temporal exclusion also requires overhead and a central manager to assign and manage allocation of time slots. In an ad-hoc network, a transceiver is required to function as a central manager. The transceiver functioning as the central manager incurs an extra computing burden to assign and manage time slots, and also consumes additional power. Thus, a battery-operated portable device may not be suitable as a central manager. Also, as described above, in the UWB wireless communication system, many signals are transmitted at a very high speed. Thus, when time synchronization has even a small error, inaccurate bit information may be transmitted. Also, bit information may become an interference signal in a different time slot. Specifically, temporal exclusion is required to be very precisely embodied. Thus, adaptability of temporal exclusion is decreased. Also, as with spatial exclusion, a great amount of control overhead is needed for temporal exclusion. This overhead can be prohibitively high for a UWB wireless communication system that operates with limited available resources.

As described above, conventional methods for solving the near/far problem in the UWB wireless communication system in the multi-user environment may not be readily embodied. Even when the conventional methods are embodied, satisfactory performance may not be possible.

Accordingly, a new technology that can reduce the above-described near/far problem and can be readily embodied is required.

SUMMARY OF THE INVENTION

This invention provides a method for solving a near/far problem in a UWB wireless communication system in a multi-user environment.

This invention also provides a receiver in a UWB wireless communication system in a multi-user environment that can solve a near/far problem.

Additional features of the invention will be set forth in the description which follows, and in part will be apparent from the description, or may be learned by practice of the invention.

The present invention discloses a method for controlling an interference in an Ultra-Wideband (UWB) wireless communication system of a multi-user environment. The method includes receiving a plurality of signal pulses that are each transmitted a predetermined number of times, calculating a first correlation value by applying a predetermined correlation mask to a first signal pulse, determining a threshold value by referring to the predetermined number of times that the first signal pulse is transmitted, a signal-to-interference-and-noise ratio (SINR), and information about a ratio of a near-interference to a far-interference, and eliminating the first signal pulse when the first correlation value is greater than the threshold value.

The present invention also discloses a method for receiving data in a UWB wireless communication system of a multi-user environment. The method includes receiving a plurality of signal pulses that are each transmitted a number of times, calculating a plurality of correlation values by applying a predetermined correlation mask to each of the plurality of signal pulses, summing the correlation values that have a value less than the threshold value, and detecting a bit corresponding to each signal pulse based on a result of the summing. Further, the threshold value is determined based on the number of times that each signal pulse is transmitted, a signal-to-interference-and-noise ratio (SINR), and information about a ratio of a near-interference to a far-interference.

The present invention also discloses an apparatus for receiving data in an Ultra-Wideband (UWB) wireless communication system of a multi-user environment. The apparatus includes a pulse receiver to receive a plurality of signal pulses that are each transmitted a number of times, a correlation unit to calculate a plurality of correlation value by applying a predetermined correlation mask to each signal pulse of the plurality of signal pulses, a threshold value determinator to determine a threshold value by referring to the number of times, a signal-to-interference-and-noise ratio (SINR), and information about a ratio of a near-interference to a far-interference, a near-interference eliminator to eliminate the near-interference from the plurality of correlation values, the near-interference being a correlation value of the plurality of correlation values having a value greater than the threshold value, and a bit detector to sum the plurality of correlation values having a value that is not greater than the threshold value, and to detect a bit corresponding to each pulse signal.

The present invention also discloses an apparatus for receiving data in a UWB wireless communication system of a multi-user environment. The apparatus includes a pulse receiver to receive a signal pulse, a correlation unit to calculate a correlation value by applying a predetermined correlation mask to the signal pulse, a memory to store a plurality of predetermined threshold values, each predetermined threshold value corresponding to one of a plurality of signal-to-interference-and-noise ratios (SINR) and one of a plurality of near-interference pulse ratios, a threshold value selector to select a predetermined threshold value from the memory with respect to the signal pulse, and a near-interference eliminator to eliminate a near-interference, the near-interference being a correlation value greater than the predetermined threshold value selected by the threshold value selector.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
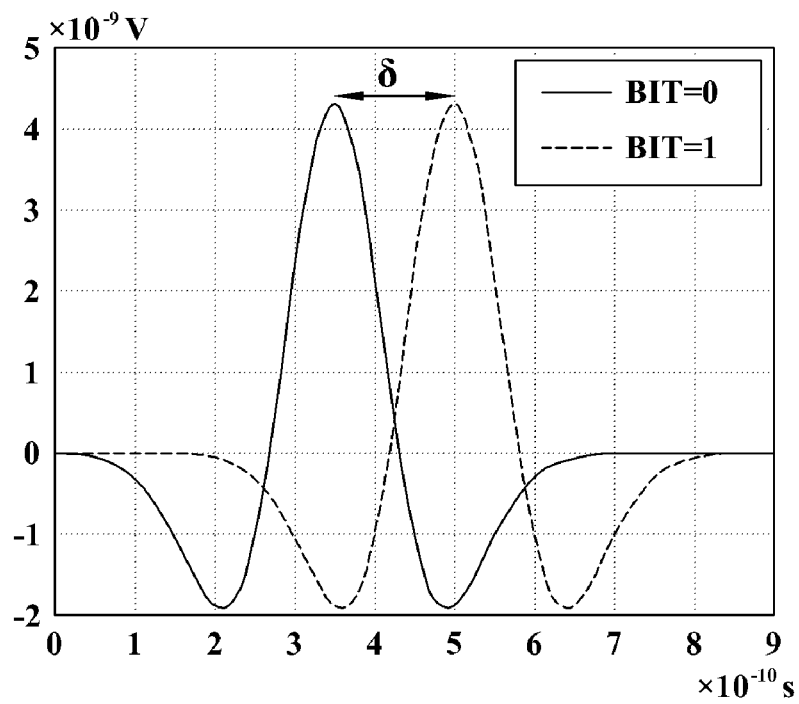
FIG. 1 is a graph illustrating a signal pulse waveform which is used for a data transmission in a time hopping-based pulse position modulation (TH-PPM) system UWB wireless communication system.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, it can be directly on, connected or coupled to the other element or layer, mechanically or electrically, or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Hereinafter, a configuration of a data receiving apparatus and an interference control method according to the present invention will be described in detail with reference to the accompanying drawings. Here, a TH-PPM system, which is a type of UWB wireless communication system, is used for convenience of description. However, the present invention is not limited to the TH-PPM system and may be applicable to any type of wireless communication system that transmits a data bit by using repeated signal pulses.

FIG. 1 is a graph illustrating a signal pulse waveform in a TH-PPM UWB wireless communication system. As illustrated in FIG. 1, in the TH-PPM UWB wireless communication system, signal pulses corresponding to a '1' bit and a '0' bit have a substantially identical waveform with a time difference δ.

Here, a signal pulse p(t) illustrated in FIG. 1 is a $2^{nd}$ derivative Gaussian function of time t, and is represented by Equation 1:

$$p(t) = \left[1 - 4\pi\left(\frac{t}{t_p}\right)^2\right] \times \exp\left[-2\pi\left(\frac{t}{t_p}\right)^2\right] \quad \text{[Equation 1]}$$

where $t_p$ is a period of the signal pulse.

Referring to FIG. 1, it can be seen that a signal pulse of the UWB wireless communication system is transmitted at a very high speed over a very short time. In this instance, a signal width may be represented in units of nanoseconds. Also, a signal size is small enough to be represented in units of nanovolts (nV). Thus, a transmitted power is also low.

In the UWB wireless communication system, an identical signal pulse is transmitted a predetermined number of times at a low transmitted power. Thus, a receiving side may receive a plurality of signal pulses and detect each data bit from the plurality of signal pulses.

Figure 2:
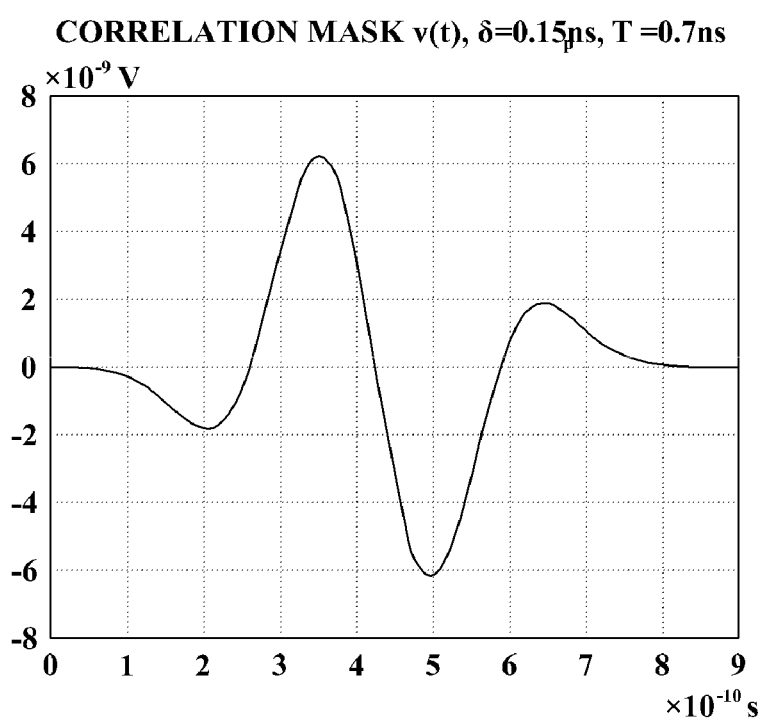
FIG. 2 is a graph illustrating a shape of a correlation mask for calculating a correlation value, which is used for detecting a bit by a receiver in a TH-PPM UWB wireless communication system.

More specifically, the receiving side receives the plurality of signal pulses, and applies a correlation mask, as illustrated in FIG. 2, to each signal pulse. Here, the correlation mask v(t) illustrated in FIG. 2 is defined by Equation 2 below. In Equation 2, p(t) equals a value of a signal pulse determined according to Equation 1 at time t, and δ equals a time difference between the '1' bit and the '0' bit.

$$v(t) = p(t) - p(t-\delta) \quad \text{[Equation 2]}$$

Assuming that a signal pulse is received without a time delay, when the correlation mask illustrated in Equation 2 is applied to the received signal pulse, a negative correlation value is acquired with respect to the bit '1' and a positive correlation value is acquired with respect to the bit '0'. Thus, a receiving side may calculate a correlation value for each signal pulse by the above-described method, sum the correlation values, and then detect a bit based on a sign of the summed correlation values. Through the above-described operation, accuracy may be improved.

When a signal is transmitted from an interfering transmitter located closer to a target receiver than an originating transmitter, the signal pulse may act as a near-interference signal if received by the target receiver. When a signal is transmitted with a specific power, the power of the signal at a distance d from the signal source may be inversely proportional to the square of distance d. Specifically, because of this inverse-square law, an effect of a single near-interference signal may be greater than an effect of a plurality of normally received signal pulses. Thus, the effect of the near-interference signal should be eliminated.

The present invention discloses a method for solving a near/far problem by determining and selecting a signal pulse that is affected by near-interference from a plurality of signal pulses received at a receiver, and eliminating the selected signal pulse affected by the near-interference.

Figure 3:
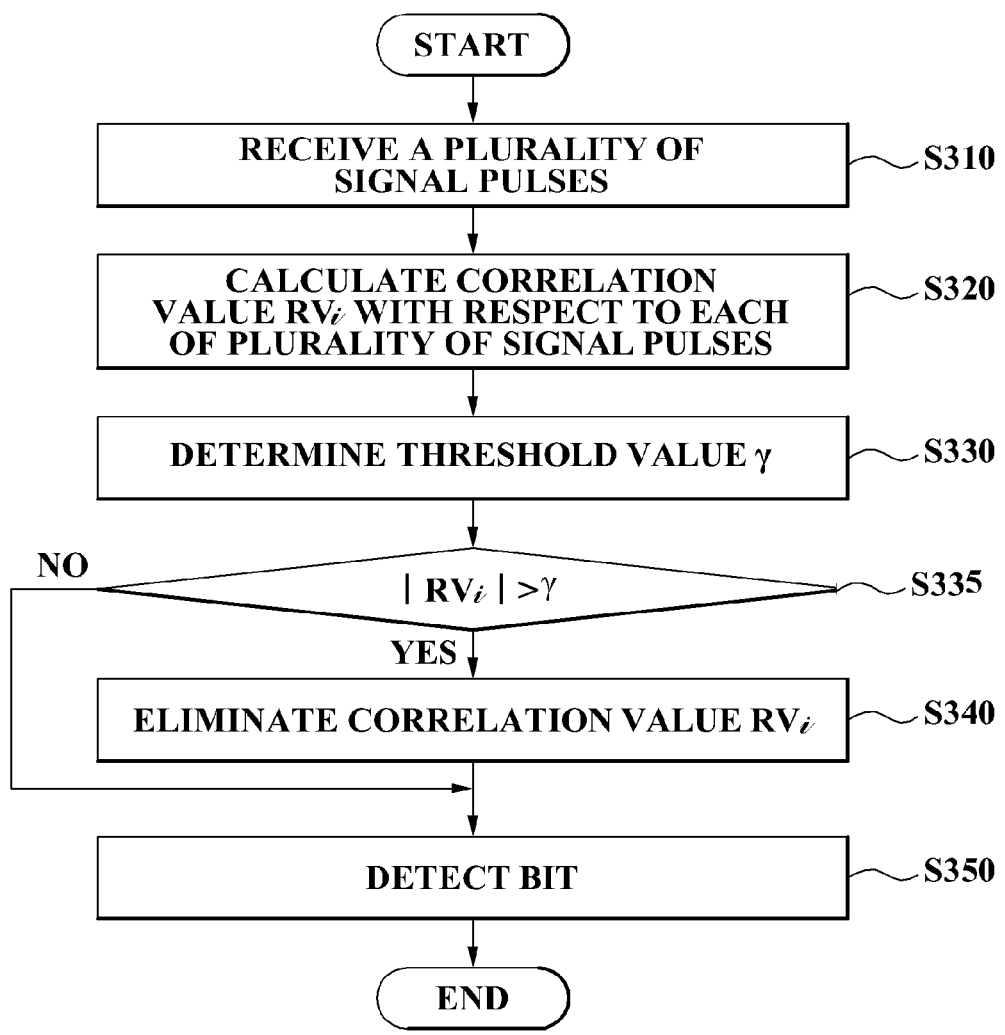
FIG. 3 is a flowchart illustrating a method for detecting a bit according to an exemplary embodiment of the present invention.

FIG. 3 is a flowchart illustrating an interference control method according to an exemplary embodiment of the present invention.

In operation S310 of FIG. 3, a receiver receives signal pulses that are transmitted a predetermined number of times from a transmitter.

In operation S320, the receiver calculates a correlation value $RV_i$ for an $i^{th}$ received signal pulse by applying a predetermined correlation mask to the $i^{th}$ received signal pulse. The receiver calculates $N_s$ correlation values $RV_i$ in operation S320, where $N_s$ is a number of times that an $i^{th}$ signal pulse is transmitted per data bit.

In operation S330, the receiver determines a threshold value γ by referring to the number of times $N_s$ that the signal pulse is transmitted, a signal-to-interference-and-noise ratio (SINR) measured with respect to each signal pulse, and information about a ratio of a near-interference to a far-interference with respect to the signal pulses.

Information about a ratio of a near-interference to a far-interference includes a "near/far ratio," which is an estimation ratio of a near-interference amount to a far-interference amount, and a "near-interference pulse ratio," which is a value acquired by measuring a ratio of distorted signal pulses due to the near-interference among the signal pulses. The near-interference amount and the far-interference amount are included in the signal pulses.

As described above, in the present exemplary embodiment, four parameters may be used to determine the threshold value γ. In this instance, the number of times $N_s$ may be a fixed value with respect to a UWB wireless communication system. Thus, a corresponding receiver may recognize the fixed value or may easily determine the fixed value via a pilot signal that transmits information corresponding to the fixed value. Also, the SINR may be calculated by using a mean and a variance measured with respect to the signal pulses. Determining the near/far ratio and the near-interference pulse ratio becomes an important issue, and will be discussed in greater detail below.

In operation S340 of FIG. 3, after operation S330, an absolute value of the correlation value $RV_i$ of the $i^{th}$ signal pulse is compared with the threshold value γ. If the absolute value of the correlation value $RV_i$ is greater than the threshold value γ in operation S335, the $i^{th}$ signal pulse is determined to be a signal pulse affected by the near-interference, and thus, the correlation value $RV_i$ corresponding thereto is eliminated in operation S340. More specifically, a value of the decision variable Zi, which is acquired from the correlation value $RV_i$ and described in further detail below, is set to 0 so that the signal pulse affected by the near-interference may be disregarded in the bit detection. If the absolute value of the correlation value $RV_i$ is less than the threshold value γ in operation S335, the $i^{th}$ signal pulse is not determined to be a signal pulse affected by the near-interference, and thus, operation S340 is skipped.

In operation S350, a bit transmitted from the transmitter is detected by using a total sum of correlation values with respect to the remaining signal pulses not affected by the near-interference. In the TH-PPM wireless communication system, when a sign of the total sum of the correlation values is negative, the bit is determined as '1', and when the sign is positive, the bit is determined as '0'.

As described above, determining the near/far ratio and the near-interference pulse ratio is an important issue, and will now be discussed in greater detail.

Figure 4A:
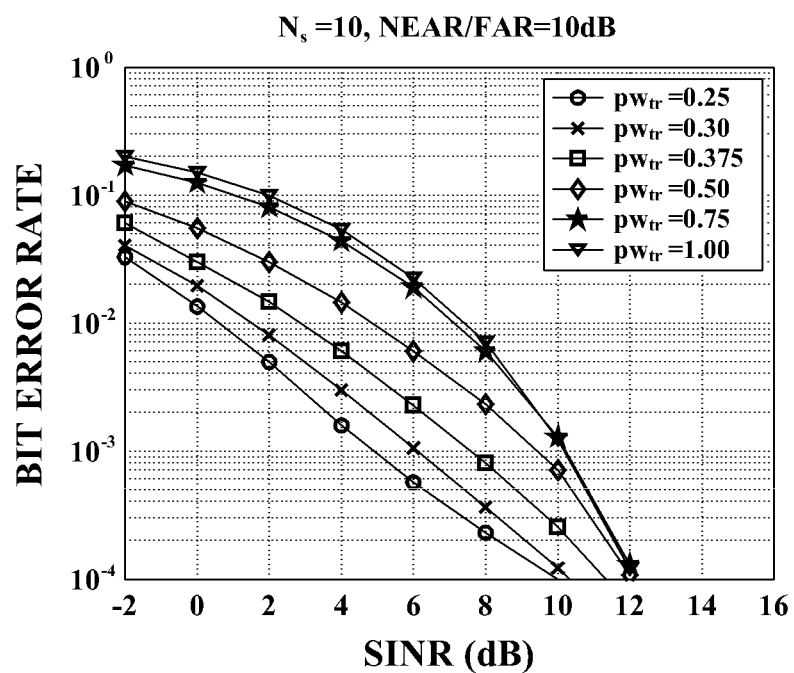
FIG. 4A is a graph illustrating a relationship between a near-interference pulse ratio and a plurality of signal pulses.
Figure 4B:
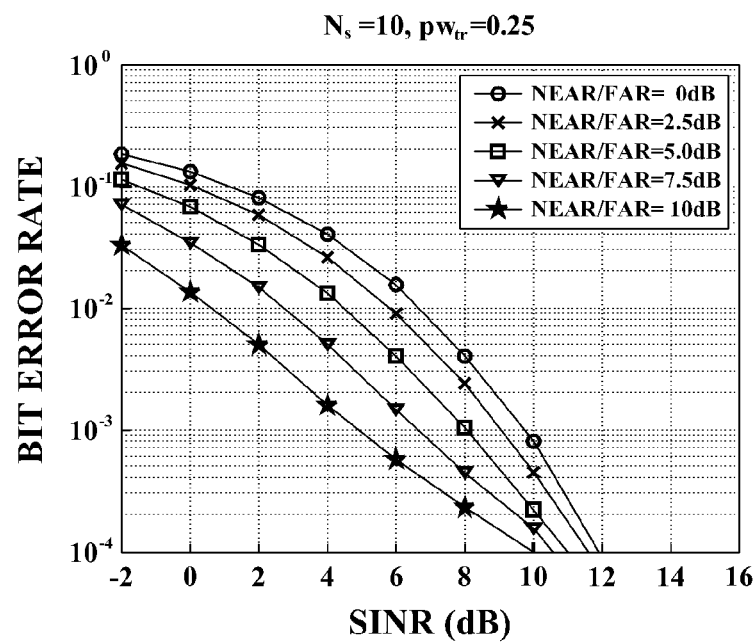
FIG. 4B is a graph illustrating a relationship between a near/far ratio and a plurality of signal pulses.

FIG. 4A is a graph illustrating a relationship between a near-interference pulse ratio and a plurality of signal pulses. FIG. 4B is a graph illustrating a relationship between a near/far ratio and a plurality of signal pulses.

A graph 410 of FIG. 4A shows a relation between SINR and a bit error rate when the near/far ratio is fixed at 10 dB, and the near-interference pulse ratio $pw_{tr}$ varies from 0.25 to 1.00. Referring to graph 410, it can be seen that the bit error rate increases as the near-interference pulse ratio $pw_{tr}$ increases when near/far ratio and SINR are held constant. A graph 420 of FIG. 4B shows a relation between the SINR and the bit error rate when the near-interference pulse ratio $pw_{tr}$ is fixed at 0.25 and the near/far ratio gradually decreases from 10 dB to 0 dB. Referring to graph 420, it can be seen that the bit error rate increases as the near/far ratio decreases when fixed near-interference pulse ratio $pw_{tr}$ and SINR are held constant.

Although different parameters were changed with respect to graph 410 and graph 420, graph 410 and graph 420 show a very similar shape with respect to the respective parameter changes. Also, referring to graph 410 and graph 420, it can be seen that a similar performance may be acquired by a combination of the near/far ratio and the near-interference pulse ratio $pw_{tr}$. Specifically, the near/far ratio and the near-interference pulse ratio $pw_{tr}$ are mathematically correlated to each other, and thus, a threshold value y to acquire a desired performance may be determined by combining the near/far ratio and the near-interference pulse ratio.

Accordingly, to acquire a desired bit error rate, the near/far ratio may be randomly determined and the near-interference pulse ratio $pw_{tr}$ corresponding thereto may be selected. Conversely, the near-interference pulse ratio $pw_{tr}$ may be randomly determined and the near/far ratio corresponding thereto may be selected. Specifically, for ease of configuration, randomly determining the near/far ratio and selecting the near-interference pulse ratio $pw_{tr}$ corresponding thereto may be more readily and easily configured. Thus, for ease of description, this method will be further described.

Figure 5:
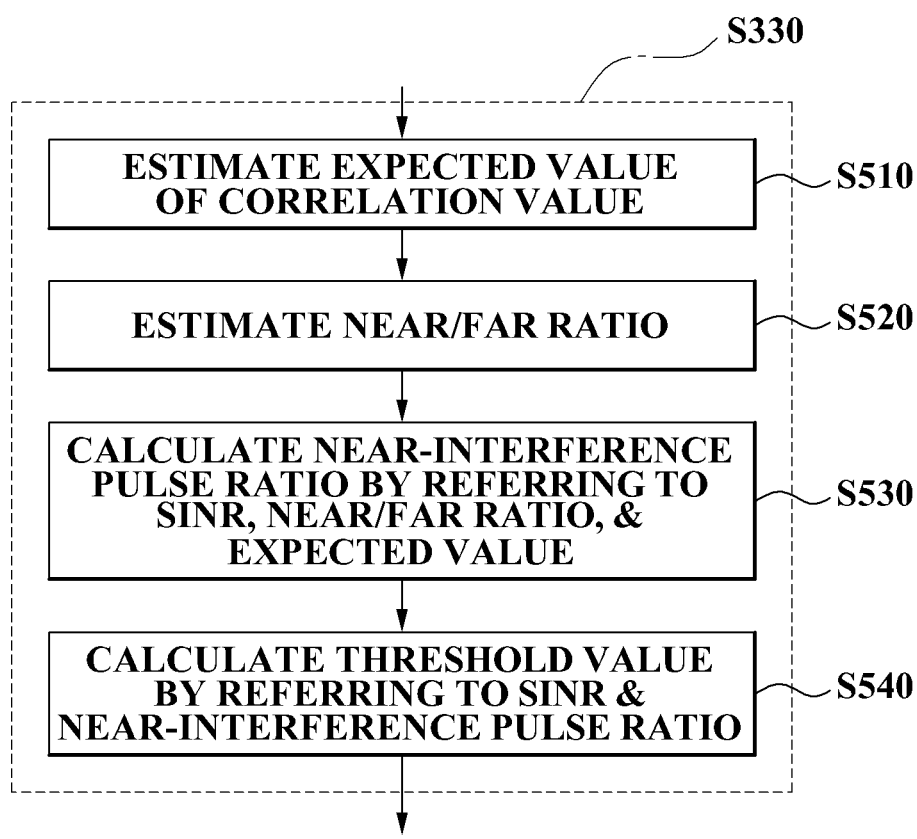
FIG. 5 is a flowchart illustrating a method for determining a threshold value illustrated in FIG. 3.

FIG. 5 is a flowchart illustrating a method for determining a threshold value y in operation S330 of FIG. 3.

In operation S510, an expected value $m_z$ of a correlation value $RV_i$ when a signal pulse is normally received is estimated based on the plurality of correlation values $RV_1$ to $RV_{Ns}$ that are calculated in operation S320. Specifically, the expected value $m_z$ may correspond to a predicted mean with respect to a correlation value $RV_i$ when a signal is normally transmitted from a transmitter to a receiver without near-interference or far-interference. The expected value $m_z$ may be acquired from the plurality of correlation values $RV_1$ to $RV_{Ns}$ or from a pilot signal.

Effects of near-interference and far-interference, which are included in the correlation value $RV_i$, may be respectively expressed as $\sigma^2_X$ and $\sigma^2_Y$, which are variances of random variables X and Y, and the effects of near-interference and far-interference are included in the received signal pulse in the TH-PPM UWB wireless communication system. SINR may then be expressed as a ratio of the expected value $m_z$ of the correlation value $RV_i$, squared ($m^2_z$), to the summed variances respectively corresponding to a near-interference amount and a far-interference amount, as given by Equation 3:

$$SINR = \frac{m_Z^2}{\sigma_X^2 + \sigma_Y^2} \quad \text{[Equation 3]}$$

Also, the near/far ratio may be represented by a ratio of $\sigma^2_X$ to $\sigma^2_Y$, respectively corresponding to a near-interference amount and a far-interference amount, as given by Equation 4:

$$\text{near/far} = \frac{\sigma_X^2}{\sigma_Y^2} \quad \text{[Equation 4]}$$

Through the measurement and calculation as described above, the expected value $m_z$ of the correlation value $RV_i$ and the SINR with respect to each signal pulse may be acquired. Thus, once the near/far ratio is determined, $\sigma^2_X$ and $\sigma^2_Y$ corresponding to a near-interference amount and a far-interference amount may be acquired. Here, $\sigma^2_X$ and $\sigma^2_Y$ are respectively represented as shown in Equation 5 and Equation 6:

$$\sigma_Y^2 = \frac{m_Z^2}{SINR} \cdot \left(1 + \frac{\text{near}}{\text{far}}\right)^{-1} \quad \text{[Equation 5]}$$

$$\sigma_X^2 = \frac{m_Z^2}{SINR} - \sigma_Y^2 \quad \text{[Equation 6]}$$

In operation S520, the near/far ratio, which is included in the signal pulses, is estimated from a plurality of correlation values $RV_1$ to $RV_{Ns}$ that are calculated with respect to the signal pulses. As described above, determining the near/far ratio first allows for a more precise selection of the near-interference pulse ratio. Thus, the near/far ratio is not required to be precisely estimated. According to an exemplary embodiment of the present invention, a threshold value γ may be determined by fixing the near/far ratio at a certain value, the number of times $N_s$, SINR, and the near-interference pulse ratio $pw_{tr}$. According to another exemplary embodiment of the present invention, the near/far ratio may be determined based on the probability distribution of the correlation value $RV_i$. Also, a value determined by a predetermined program logic by considering characteristics of a channel environment and characteristics according to a type of UWB wireless communication system, or a value inputted by an administrator may be applied as the near/far ratio.

In operation S530, the receiver calculates the near-interference pulse ratio $pw_{tr}$ by referring to the expected value $m_z$ of the correlation value $RV_i$, the SINR, and the near/far ratio. Here, the near-interference pulse ratio $pw_{tr}$ designates a ratio of signal pulses affected by near-interference from among the plurality of signal pulses. Hereinafter, operation S530 will be further described in detail.

When the SINR, which is measured with respect to the plurality of signal pulses, the expected value $m_z$, which is estimated in operation S510, and the near/far ratio, which is determined in operation S520, are substituted into Equation 5, far-interference amount $\sigma_Y^2$ may be determined. Whether a particular signal pulse is affected by the near-interference may be determined by a difference between a correlation value $RV_i$ of the signal pulse and the expected value $m_z$.

More specifically, when the difference is greater than a certain multiple of the far-interference amount $\sigma_Y^2$, the pulse signal may have been affected by the near-interference. According to an exemplary embodiment of the present invention, the certain multiple may be selected to be √2. Specifically, when a deviation from the expected value $m_z$ of the correlation value $RV_i$ is greater than √2, which is generally predicted with respect to a far-interference, the deviation is determined to be an affect by the near-interference. According to the present embodiment, when a correlation value with respect to an $i^{th}$ signal pulse is $RV_i$, and $|m_z - RV_i| > \sqrt{2}\sigma_Y$, the $i^{th}$ signal pulse is determined to have been affected by the near-interference. Also, when $|m_z - RV_i| \leq \sqrt{2}\sigma_Y$, the $i^{th}$ signal pulse is determined not to have been affected by the near-interference.

When the multiple of √2 was applied, a sufficient performance to eliminate the near-interference was experimentally proven. However, depending upon the channel environment or the type of UWB wireless communication system of the present invention, the multiple may be determined by statistical or mathematical analysis.

In operation S530, the near-interference pulse ratio $pw_{tr}$ is calculated. Here, the near-interference pulse ratio $pw_{tr}$ is a ratio of signal pulses that have been affected by the near-interference versus a total number of signal pulses.

In operation S540, the threshold value γ is calculated by referring to the SINR and the near-interference pulse ratio $pw_{tr}$, which is acquired in operation S530. The threshold value γ may be determined from these parameters based on a statistical criterion or by a heuristic method. Also, the threshold value γ may be determined by a mathematical analysis method, which will be described later.

Correlation values $RV_i$ affected by the near-interference, correlation values $RV_i$ affected by the far-interference, and correlation values $RV_i$ affected by both the near-interference and the far-interference, may be respectively modeled as random variables X, Y, and W. Probability density functions $f_X$, $f_Y$, and $f_W$ with respect to the random variables X, Y and W are expressed by Equation 7, Equation 8, and Equation 9, respectively:

$$f_X(x) = \frac{a}{2} e^{-a|x|}, m_X = 0, \sigma_X^2 = \frac{2}{a^2}. \quad \text{[Equation 7]}$$

$$f_Y(y) = \frac{a}{\sqrt{2\pi\sigma^2}} e^{-\frac{(y-m)^2}{2\sigma^2}}, m_Y = m, \sigma_Y^2 = \sigma^2. \quad \text{[Equation 8]}$$

$$\begin{aligned} f_W(w) &= \int_{-\infty}^{\infty} f_X(w-x) f_Y(x) \, dx \\ &= \frac{a}{2} e^{\frac{a^2\sigma^2}{2}} e^{a(m-w)} Q\left(\frac{m-w+a\sigma^2}{\sigma}\right) + \\ &\quad \frac{a}{2} e^{\frac{a^2\sigma^2}{2}} e^{a(w-m)} Q\left(\frac{w-m+a\sigma^2}{\sigma}\right) \end{aligned} \quad \text{[Equation 9]}$$

where m designates the mean of correlation values with respect to the plurality of signal pulses, and Q(u) is the normal distribution function of a value u.

With respect to a threshold value γ to be acquired in operation S540, two variables Γ(γ) and Λ(γ) may be given by Equation 10 and Equation 11 below. Here, Γ(γ) and Λ(γ) respectively designate a probability that absolute values of the random variables Y and W are less than the threshold value γ and are expressed by Equation 10 and Equation 11.

$$\Gamma(\gamma) = \int_{-\gamma}^{\gamma} f_Y(y) dy \qquad \text{[Equation 10]}$$
$$= 1 - Q\left(\frac{\gamma+m}{\sigma}\right) + Q\left(\frac{\gamma-m}{\sigma}\right)$$

$$\Lambda(\gamma) = \int_{-\gamma}^{\gamma} f_W(w) dw \qquad \text{[Equation 11]}$$
$$= \frac{1}{2} e^{\frac{a^2\sigma^2}{2}} e^{a(m+\gamma)} Q\left(\frac{m+\gamma+a\sigma^2}{\sigma}\right) -$$
$$\frac{1}{2} e^{\frac{a^2\sigma^2}{2}} e^{a(m-\gamma)} Q\left(\frac{m-\gamma+a\sigma^2}{\sigma}\right) +$$
$$\frac{1}{2} e^{\frac{a^2\sigma^2}{2}} e^{a(\gamma-m)} Q\left(\frac{\gamma-m+a\sigma^2}{\sigma}\right) -$$
$$\frac{1}{2} e^{\frac{a^2\sigma^2}{2}} e^{-a(\gamma+m)} Q\left(\frac{-\gamma-m+a\sigma^2}{\sigma}\right) +$$
$$1 - Q\left(\frac{\gamma+m}{\sigma}\right) - Q\left(\frac{\gamma-m}{\sigma}\right)$$

The received signal pulses are generally classified into two types. A first type of received signal pulse is a signal pulse affected by the far-interference. A correlation value $RV_i$ with respect to the first type of signal pulse may be modeled as a Gaussian random variable Y. A second type of received signal pulse is a signal pulse affected by both the near-interference and the far-interference. A correlation value $RV_i$ with respect to the second type of signal pulse may be modeled as a random variable, $W=X+Y$, which is a sum of the Gaussian random variable Y and a Laplacian random variable X.

Specifically, where the absolute value of the correlation value $RV_i$ is out of the range of the threshold value $\gamma$ and is truncated, and when the random variables Y and W are expressed as $Y_{tr}$ and $W_{tr}$, probability density functions $f_{Y_{tr}}$ and $f_{W_{tr}}$, mean $m_{Y_{tr}}$ and $m_{W_{tr}}$, and variance $\sigma^2_{Y_{tr}}$ and $\sigma^2_{W_{tr}}$ with respect to the random variables Y and W are expressed as shown below in Equation 12, Equation 13, Equation 14, Equation 15, Equation 16, and Equation 17:

$$f_{Y_{tr}}(y) = \frac{1}{\Gamma(\gamma)} f_Y(y), \; -\gamma < y < \gamma. \qquad \text{[Equation 12]}$$

$$m_{Y_{tr}}(\gamma) = \int_{-\gamma}^{\gamma} y f_{Y_{tr}}(y) dy \qquad \text{[Equation 13]}$$
$$= m + \frac{\sigma}{\Gamma(\gamma)\sqrt{2\pi}} \left( e^{-\frac{(\gamma+m)^2}{2\sigma^2}} - e^{-\frac{(\gamma-m)^2}{2\sigma^2}} \right)$$

$$\sigma^2_{Y_{tr}}(\gamma) = \int_{-\gamma}^{\gamma} (y - m_{Y_{tr}}(\gamma))^2 f_{Y_{tr}}(y) dy \qquad \text{[Equation 14]}$$
$$= \sigma^2 + m^2 - m^2_{Y_{tr}}(\gamma) -$$
$$\frac{\sigma}{\Gamma(\gamma)\sqrt{2\pi}} (\gamma - m) e^{-\frac{(\gamma+m)^2}{2\sigma^2}} +$$
$$\frac{\sigma}{\Gamma(\gamma)\sqrt{2\pi}} (\gamma + m) e^{-\frac{(\gamma-m)^2}{2\sigma^2}}$$

$$f_{W_{tr}}(w) = \frac{1}{\Lambda(\gamma)} f_W(w), \; -\gamma < w < \gamma. \qquad \text{[Equation 15]}$$

$$m_{W_{tr}}(\gamma) = \int_{-\gamma}^{\gamma} w f_{W_{tr}}(w) dw \qquad \text{[Equation 16]}$$
$$= \frac{1 - a\gamma}{2a\Lambda(\gamma)} e^{\frac{a^2\sigma^2}{2}} e^{a(m+\gamma)}$$
$$Q\left(\frac{m+\gamma+a\sigma^2}{\sigma}\right) +$$
$$\frac{a\gamma - 1}{2a\Lambda(\gamma)} e^{\frac{a^2\sigma^2}{2}} e^{a(\gamma-m)}$$
$$Q\left(\frac{\gamma-m+a\sigma^2}{\sigma}\right) -$$
$$\frac{a\gamma + 1}{2a\Lambda(\gamma)} e^{\frac{a^2\sigma^2}{2}} e^{a(m-\gamma)}$$
$$Q\left(\frac{m-\gamma+a\sigma^2}{\sigma}\right) +$$
$$\frac{a\gamma + 1}{2a\Lambda(\gamma)} e^{\frac{a^2\sigma^2}{2}} e^{-a(\gamma+m)}$$
$$Q\left(\frac{-\gamma-m+a\sigma^2}{\sigma}\right) +$$
$$\frac{1}{\Lambda(\gamma)} \frac{\sigma}{\sqrt{2\pi}} \left( e^{-\frac{(\gamma+m)^2}{2\sigma^2}} - e^{-\frac{(\gamma-m)^2}{2\sigma^2}} \right) +$$
$$\frac{m}{\Lambda(\gamma)} \left( 1 - Q\left(\frac{\gamma+m}{\sigma}\right) - Q\left(\frac{\gamma-m}{\sigma}\right) \right)$$

$$\sigma^2_{W_{tr}}(\gamma) = \int_{-\gamma}^{\gamma} (w - m_{W_{tr}}(\gamma))^2 f_{W_{tr}}(w) dw \qquad \text{[Equation 17]}$$
$$= \frac{a^2\gamma^2 - 2a\gamma + 2}{2a^2\Lambda(\gamma)} e^{\frac{a^2\sigma^2 + 2a(m+\gamma)}{2}}$$
$$Q\left(\frac{m+\gamma+a\sigma^2}{\sigma}\right) +$$
$$\frac{a^2\gamma^2 - 2a\gamma + 2}{2a^2\Lambda(\gamma)} e^{\frac{a^2\sigma^2 + 2a(\gamma-m)}{2}}$$
$$Q\left(\frac{\gamma-m+a\sigma^2}{\sigma}\right) -$$
$$\frac{a^2\gamma^2 + 2a\gamma + 2}{2a^2\Lambda(\gamma)} e^{\frac{a^2\sigma^2 + 2a(m-\gamma)}{2}}$$
$$Q\left(\frac{m-\gamma+a\sigma^2}{\sigma}\right) -$$
$$\frac{a^2\gamma^2 + 2a\gamma + 2}{2a^2\Lambda(\gamma)} e^{\frac{a^2\sigma^2 - 2a(\gamma+m)}{2}}$$
$$Q\left(\frac{-\gamma-m+a\sigma^2}{\sigma}\right) - \frac{\sigma}{\Lambda(\gamma)\sqrt{2\pi}}$$
$$\left( (\gamma - m) e^{-\frac{(\gamma+m)^2}{2\sigma^2}} + (\gamma + m) e^{-\frac{(\gamma-m)^2}{2\sigma^2}} \right) +$$
$$\frac{a^2\sigma^2 + 2 + a^2 m^2}{a^2\Lambda(\gamma)}$$
$$\left( 1 - Q\left(\frac{\gamma+m}{\sigma}\right) - Q\left(\frac{\gamma-m}{\sigma}\right) \right) - m^2_{W_{tr}}(\gamma)$$

Among decision variables Z used for bit detection after eliminating the correlation values of the signal pulses affected by the near-interference, decision variable $Z_i$ generated from the $i^{th}$ signal pulse is represented as:

$$Z_i = B_{Y_{tr}} Y_{tr} + B_{W_{tr}} W_{tr} \qquad \text{[Equation 18]}$$

In this instance, random variable $B_{Y_{tr}}$ has a value of '1' when a signal pulse affected by only the far-interference is not eliminated, and has a value of '0' when the signal pulse is eliminated. Also, random variable $B_{W_{tr}}$ has a value of '1' when a signal pulse affected by both the near-interference and the far-interference is not eliminated, and has a value of '0' when the signal pulse is eliminated.

Mean $m_{zi}$ and variance $\sigma^2_{Zi}$ of random variable $Z_i$ are expressed as shown below in Equation 19 and Equation 20:

$$m_{Zi}(\gamma) = p_f \Gamma(\gamma) \cdot m_{Ytr}(\gamma) + p_n \Lambda(\gamma) \cdot m_{Wtr}(\gamma) \quad \text{[Equation 19]}$$

$$\sigma^2_{Zi}(\gamma) = p_f \Gamma(\gamma)(\sigma^2_{Ytr}(\gamma) + (1 - p_f \Gamma(\gamma))m^2_{Ytr}(\gamma)) + \quad \text{[Equation 20]}$$
$$p_n \Lambda(\gamma)(\sigma^2_{Wtr}(\gamma) + (1 - p_n \Lambda(\gamma))m^2_{Wtr}(\gamma))$$

where $p_f$ designates a probability that the signal pulse is affected by only the far-interference and $p_n$ designates a probability that the signal pulse is affected by both the near-interference and the far-interference.

The decision variable Z may be determined as a total sum of $Z_i$. Also, when mean $m_Z(\gamma)$ and variance $\sigma^2_Z(\gamma)$ of the decision variable Z are the same to values that are acquired by multiplying $m_{Zi}(\gamma)$ and $\sigma^2_{Zi}(\gamma)$ by the number of times $N_s$, the bit error rate $P_e(\gamma)$ in the TH-PPM wireless communication system is calculated by Equation 21:

$$P_e(\gamma) = \int_{-\gamma N_s}^{0} \frac{1}{\sqrt{2\pi\sigma^2_Z(\gamma)}} e^{\frac{(z-m_Z(\gamma))^2}{2\sigma^2_Z(\gamma)}} dz + \quad \text{[Equation 21]}$$
$$\left(\frac{1-p_f\Gamma(\gamma)}{2}\right)^{N_s} + \left(\frac{1-p_n\Lambda(\gamma)}{2}\right)^{N_s}$$
$$= Q\left(\frac{m_Z(\gamma)}{\sqrt{\sigma^2_Z(\gamma)}}\right) - Q\left(\frac{\gamma N_s m_Z(\gamma)}{\sqrt{\sigma^2_Z(\gamma)}}\right) +$$
$$\left(\frac{1-p_f\Gamma(\gamma)}{2}\right)^{N_s} + \left(\frac{1-p_n\Lambda(\gamma)}{2}\right)^{N_s}$$

Here, Equation 21 corresponds to a convex function. Thus, an optimum threshold value $\gamma$ corresponds to $\gamma$ when the bit error rate $P_e(\gamma)$ has a minimum value, i.e. when a $1^{st}$ derivative value of the bit error rate $P_e(\gamma)$ equals 0. Equation 22 as follows corresponds to a closed form of an equation to acquire an optimum threshold value $\gamma$ that satisfies the above-described condition, and is given below:

$$m_Z(\gamma) \cdot \frac{d}{d\gamma}\{\sigma^2_Z(\gamma)\} - 2\frac{d}{d\gamma}\{m_Z(\gamma)\} \cdot \sigma^2_Z(\gamma) = 0 \quad \text{[Equation 22]}$$

The optimum threshold value $\gamma$ is thus acquired by calculating a value of an equation represented as Equation 22. The receiver detects a signal pulse affected by the near-interference by applying the acquired $\gamma$.

According to an exemplary embodiment of the present invention, a threshold value $\gamma$ may be selected from a table by maintaining the table that stores threshold values with respect to parameter values within a predetermined range, and by referring to a parameter value acquired for a received signal pulse. Thus, the threshold value $\gamma$ may be selected from a table stored in a memory rather than calculating the threshold value $\gamma$ using Equation 22 for each received signal pulse.

When the number of times $N_s$ that a signal pulse is transmitted, and the near/far ratio are predetermined values among parameters that are referred to and used to determine the threshold values $\gamma$, parameters, SINRs, and the near-interference pulse ratio $pw_{tr}$ may be used to select the threshold value $\gamma$ from the table.

As described above, a threshold value $\gamma$ may be more quickly determined by storing a pre-calculated threshold value $\gamma$ in a form of a table stored in a memory, using a parameter value as an index, and thereby selecting an optimum threshold value y from the table. Here, the parameter value may be comparatively simply calculated with respect to a received signal pulse.

According to an exemplary embodiment of the present invention, the above-described interference control method may be applied to the UWB wireless communication system, which may be an ad-hoc network. Here, the ad-hoc network may designate a network without a base structure, such as an access point, a base station for constructing and maintaining a network, and the like. In the ad-hoc network, since nodes accessing the network may freely move, a network topology may dynamically change.

Studies regarding the UWB wireless communication system to construct the ad-hoc network are being actively carried out. Also, a conventional method may not be applied in the ad-hoc network without a separate base station for accurately matching synchronization between nodes or performing scheduling. Thus, the interference control method according to an exemplary embodiment of the present invention may be optimized for the UWB wireless communication network in an ad-hoc form.

As described above, when the interference control method according to an exemplary embodiment of the present invention is applied to the ad-hoc network, an excellent effect may be acquired. Also, the interference control method according to an exemplary embodiment of the present invention may be applied to a network that includes a base station in charge of scheduling a wireless communication resource between nodes. Specifically, even when the interference control method according to an exemplary embodiment of the present invention is applied to the network with a base station, the present invention may be more easily configured in comparison to the conventional method. Particularly, the interference control method may be applied in an environment where power control according to a distance between a base station and a node may not be applied. Also, even when the synchronization between the nodes may not be accurately matched due to various reasons, the interference control method may effectively solve the near/far problem.

The interference control method and data transmission method according to the above-described exemplary embodiment of the present invention may be recorded in computer-readable media including program instructions to implement various operations embodied by a computer. The media may also include, alone or in combination with the program instructions, data files, data structures, and the like. Examples of computer-readable media may include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

Figure 6:
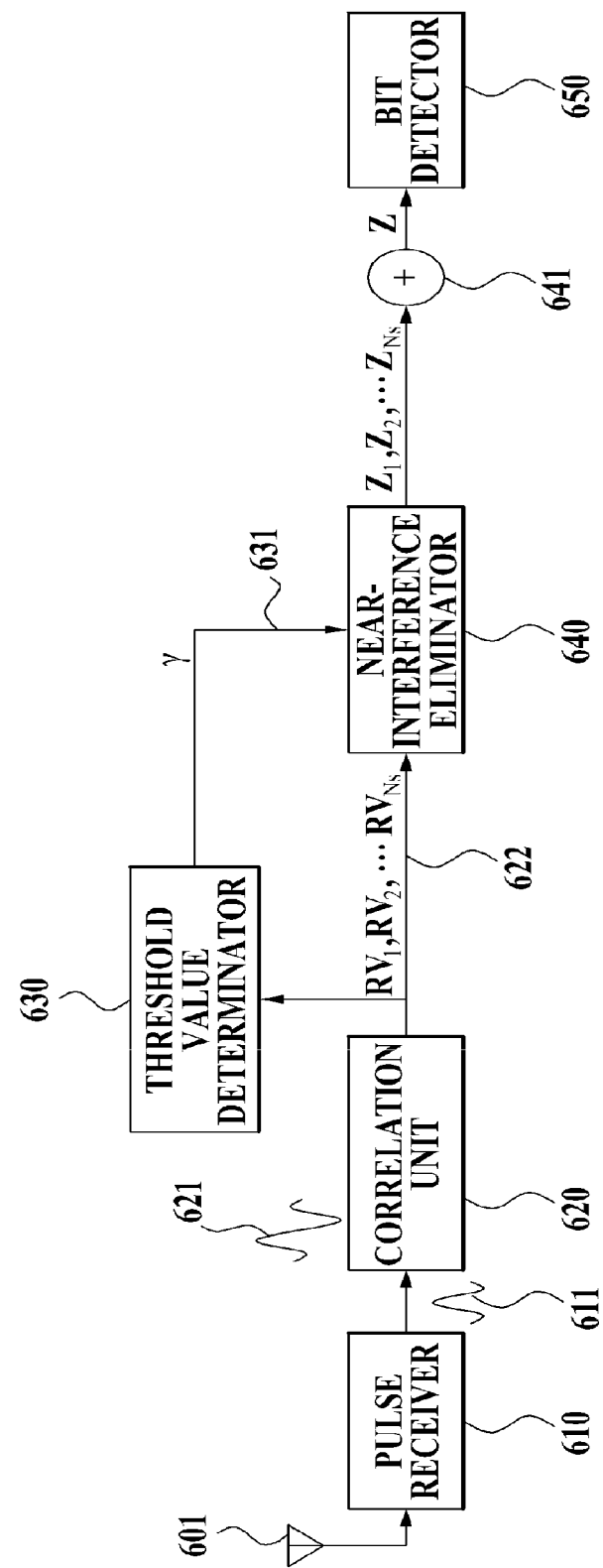
FIG. 6 is a block diagram illustrating a data receiving apparatus according to an exemplary embodiment of the present invention.

FIG. 6 is a block diagram illustrating a data receiving apparatus according to another exemplary embodiment of the present invention. The configuration and operation of the data receiving apparatus will be described with reference to FIG. 6.

Signal pulses 611 may be transmitted from a transmitter (not shown) and received by an antenna 601. The signal pulses 611 may then be received by a pulse receiver 610 connected to the antenna 601. Each signal pulse 611 received by the pulse receiver 610 is then inputted into a correlation unit 620. The correlation unit 620 applies a correlation mask 621 to each signal pulse 611, and thereby determines and outputs a correlation value RVi 622 corresponding to each signal pulse 611.

A threshold value determinator 630 determines a threshold value y 631, based on the number of times $N_s$ that the signal pulse 611 is transmitted, SINR, and information about a near/far ratio. Here, the number of times $N_s$ that the signal pulse 611 is transmitted may be fixed at a certain value according to a type of UWB wireless communication system employing the data receiving apparatus. Thus, the number of times $N_s$ a pulse is transmitted may be a fixed value. Also, the SINR may be calculated by using an expected value $m_z$ and variance with respect to a plurality of correlation values $RV_1$ to $RV_{Ns}$. Here, the expected value may correspond to a predicted mean of a correlation value $RV_i$ when the signal pulse is normally received without interference.

As previously described, information about the near/far ratio may include a near/far ratio or a near-interference pulse ratio.

The threshold value y 631, which is determined by the threshold value determinator 630, is inputted into a near-interference eliminator 640. The near-interference eliminator 640 receives a plurality of correlation values $RV_1$ to $RV_{Ns}$ 622. The near-interference eliminator 640 determines and eliminates a correlation value $RV_i$ greater than the threshold value γ 631 from among the plurality of correlation values $RV_1$ to $RV_{Ns}$ 622 as a signal pulse affected by the near-interference.

A summator 641 acquires a decision variable $$Z = \sum_{i=1}^{N_s} Z_i$$

by summing $Z_1$ to $Z_{Ns}$ that are acquired with respect to a total number $N_s$ of correlation values $RV_1$ to $RV_{Ns}$ 622, not including a correlation value $RV_i$ greater than the threshold value γ 631. Here, the decision variable Z is inputted into a bit detector 650, and the bit detector 650 determines a value of a received bit by referring to a sign of the inputted decision variable Z. In the TH-PPM wireless communication system, when a sign of the decision variable Z is negative, the bit is designated '1' and when a sign of the decision variable Z is positive, the bit is designated '0'.

Figure 7:
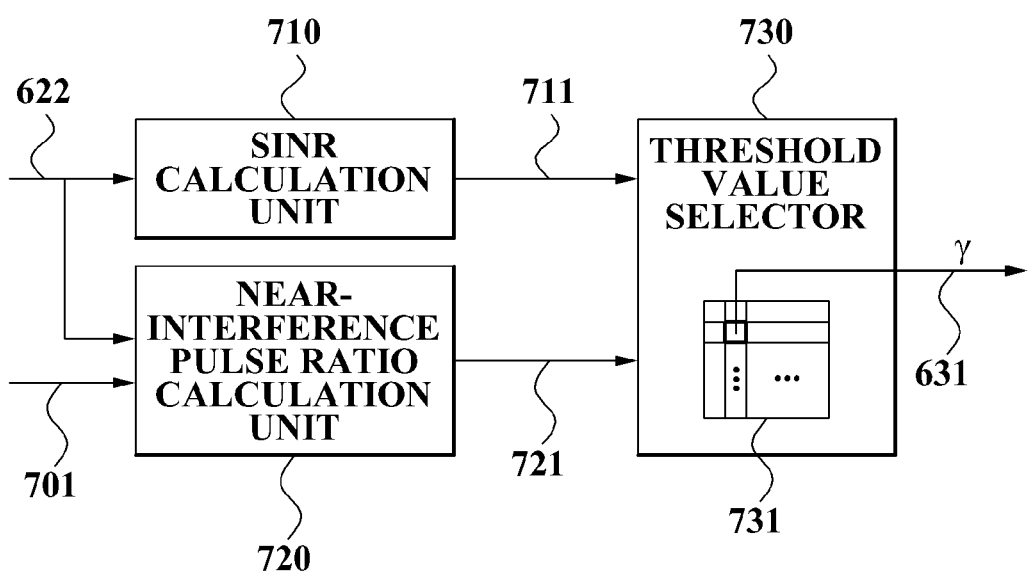
FIG. 7 is a block diagram illustrating a threshold value determinator of the data receiving apparatus shown in FIG. 6.

FIG. 7 is a block diagram illustrating the threshold value determinator 630 shown in FIG. 6.

Referring to FIG. 7, the threshold value determinator 630 includes an SINR calculation unit 710 that calculates SINR with respect to each signal pulse 611. The SINR calculation unit 710 calculates an SINR 711 of a received signal pulse 611 based on the plurality of correlation values $RV_1$ to $RV_{Ns}$ 622 calculated by the correlation unit 620.

A near-interference pulse ratio calculation unit 720 calculates a near-interference pulse ratio 721 based on the plurality of correlation values $RV_1$ to $RV_{Ns}$ 622 and the plurality of near/far ratios.

When a difference between the correlation value $RV_i$ 622 and the expected value $m_z$ is greater than a certain multiple of variance by the far-interference, for example, greater than √2, the near-interference pulse ratio calculation unit 720 determines a corresponding signal pulse as a signal pulse affected by the near-interference. As an example, a ratio of a signal pulse, which corresponds to where the difference between the correlation value $RV_i$ and the expected value $m_z$ satisfies $|RV_i - m_z| > \sqrt{2}\sigma_Y$ with respect to the far-interference amount $\sigma_Y$, among a total of signal pulses, is outputted as a near-interference pulse ratio 721.

A threshold value selector 730 determines an optimum threshold value γ by referring to the number of times $N_s$, the SINR 711, and the near-interference pulse ratio 721. More specifically, the threshold value selector 730 may include a memory 731 which stores pre-calculated values with respect to the plurality of near-interference pulse ratios and the plurality of SINRs within a predetermined range. Also, the threshold value selector 730 may be constructed to extract the threshold value γ 631 from the memory 731 by referring to the inputted SINR 711 and the near-interference pulse ratio 721.

Figure 8:
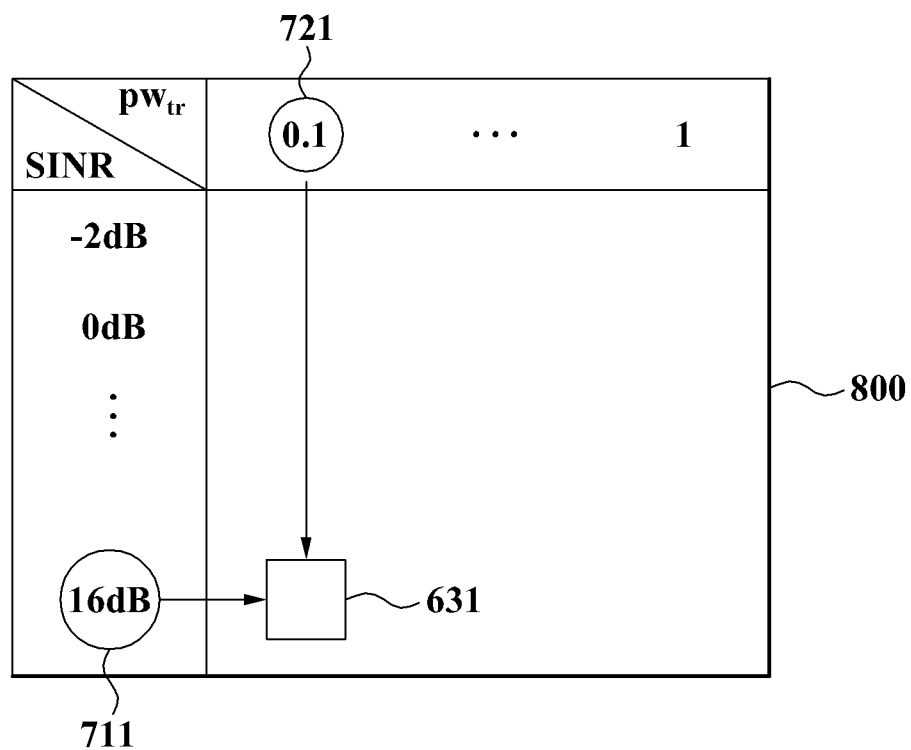
FIG. 8 is a diagram illustrating a threshold value table stored in a memory shown in FIG. 7.

FIG. 8 is a diagram illustrating a configuration of a threshold value table 800, which is included in the memory 731. The threshold value table 800 includes the near-interference pulse ratio $pw_{tr}$ 721 along a first row and includes SINR 711 along a first column. Here, the near-interference pulse ratio $pw_{tr}$ 721 may include a range from about 0.1 to about 1. Also, the SINR may include a range of about −2 dB to about 16 dB. Also, the threshold value table 800 stores a pre-calculated threshold value γ corresponding to the number of times $N_s$ and the near/far ratio.

According to an exemplary embodiment of the present invention, the number of times $N_s$ may be a fixed value with respect to the UWB wireless communication system. Also, the near/far ratio may be a particular value which is fixed according to a type of UWB wireless communication system, or a value which is determined by, for example, a system administrator.

FIG. 8 further illustrates a process of extracting a threshold value γ 631 corresponding to an SINR 711 of, for example, 16 dB, and an SINR 721 of, for example, 0.1, from the threshold value table 800.

In FIG. 7 and FIG. 8, the memory 731 is shown to include only a single threshold value table 800 with respect to the number of times $N_s$, which is fixed at a predetermined value. However, according to another exemplary embodiment of the present invention, the memory 731 may include a plurality of threshold value tables 800 each corresponding to a predetermined number of times N. Here, the number of times $N_s$ may change depending upon a channel environment. In this instance, a receiver may receive information about the number of times $N_s$ from a transmitter via a pilot signal, and select a table corresponding to the received number of times $N_s$ from a plurality of threshold value tables 800.

Here, the UWB wireless communication system employing the data receiving apparatus according to the present invention may be a TH-PPM system. Also, the UWB wireless communication system employing the data receiving apparatus may be an ad-hoc network.

A configuration of a data receiving apparatus according to the present invention has been described with reference to FIG. 6, FIG. 7, and FIG. 8. Detailed descriptions made with reference to FIG. 1, FIG. 2, FIG. 3, FIG. 4, and FIG. 5 may be applicable to the data receiving apparatus and have not been repeated. Also, descriptions associated with FIG. 6, FIG. 7, and FIG. 8 may be applicable to the interference control method described with reference to FIG. 1, FIG. 2, FIG. 3, FIG. 4, and FIG. 5.

Figure 9:
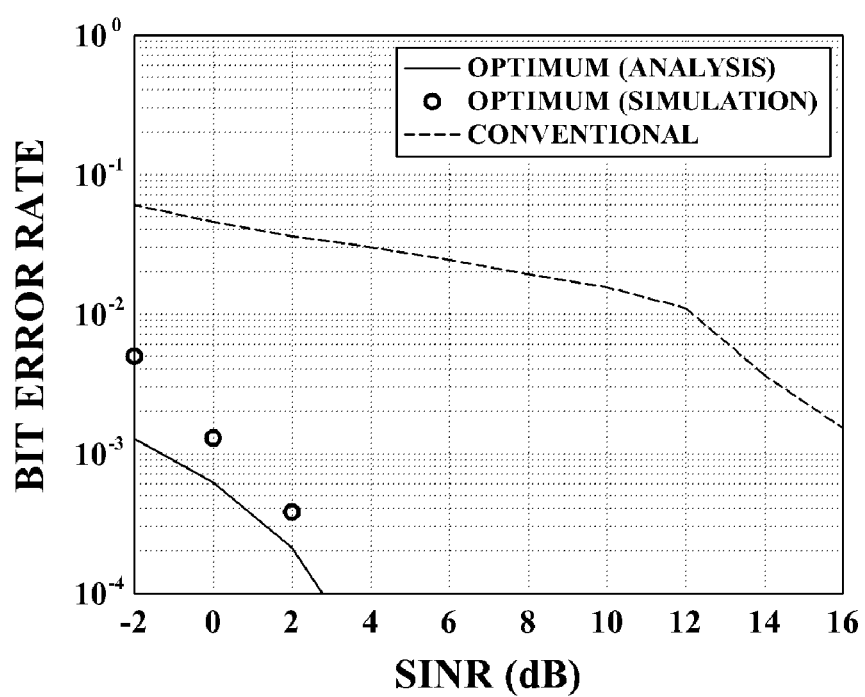
FIG. 9 is a graph illustrating a simulation test result when a near-interference is dominant according to an exemplary embodiment of the present invention.
Figure 10:
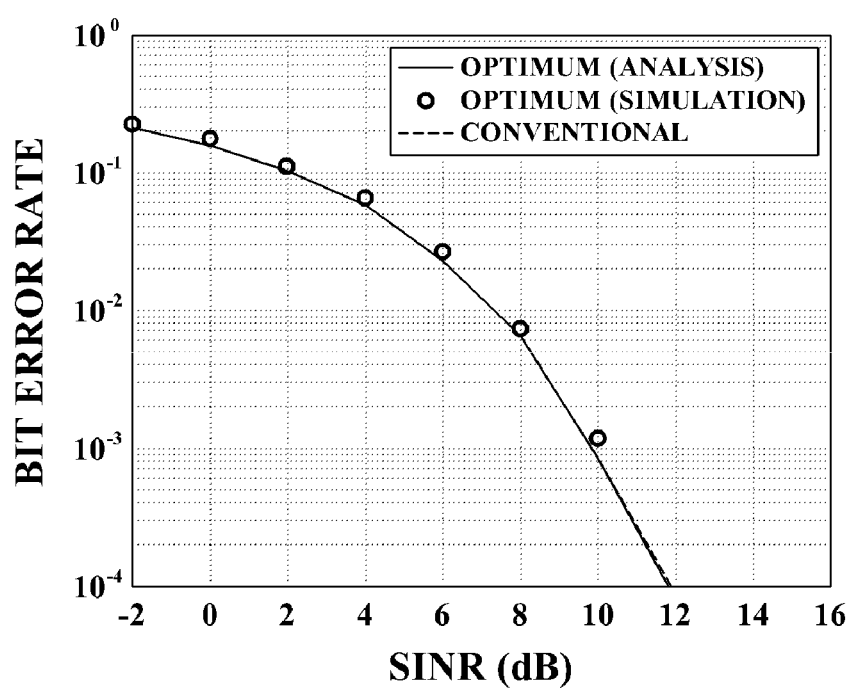
FIG. 10 is a graph illustrating a simulation test result when a far-interference is dominant according to an exemplary embodiment of the present invention.
Figure 11:
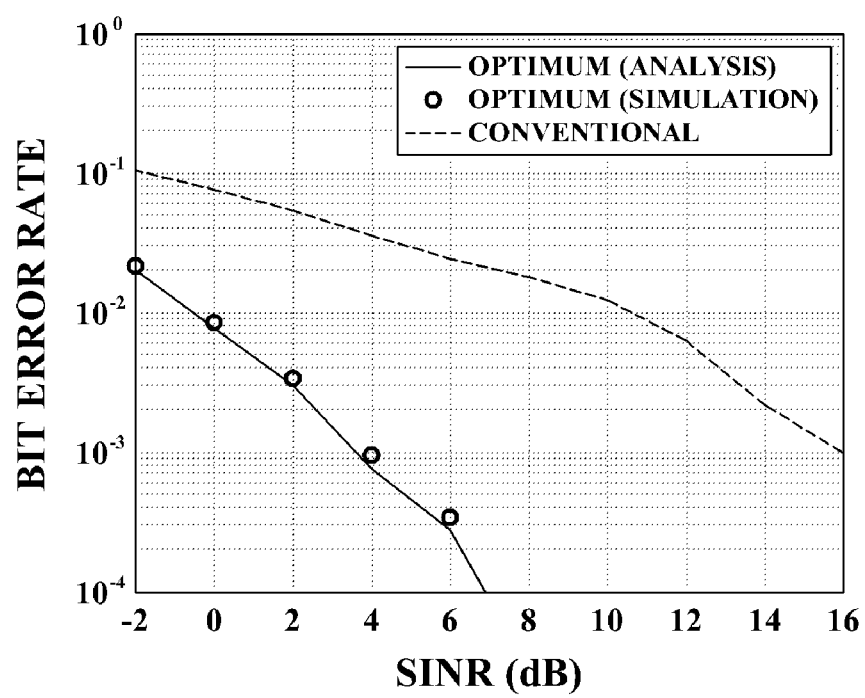
FIG. 11 is a graph illustrating a simulation test result when both a near-interference and a far-interference exist according to an exemplary embodiment of the present invention.

FIG. 9, FIG. 10, and FIG. 11 illustrate simulation test results with respect to a performance enhancement by an interference control method and a data receiving apparatus according to exemplary embodiments of the present invention. With respect to parameters used in the simulation test, the near/far ratio is 14 dB, the number of times $N_s$ is 10, and a channel activity factor is 0.2.

FIG. 9 is a graph illustrating a performance curve when 14 interferers are located within a range of about 10 meters from the receiver. The graph of FIG. 9 shows a performance enhancement effect when a near-interference is dominant.

Referring to FIG. 9, when an optimum threshold value γ calculated by a mathematical analysis method is applied, a performance curve is indicated by a black solid line. Also, when an optimum threshold value acquired from the simulation test is applied, a performance curve is indicated by a circle ○. Here, the optimum threshold value γ acquired from the simulation test shows little difference in performance from when the optimum threshold value γ by analysis is applied, but still shows an excellent performance in comparison to the conventional method of not utilizing a technology of eliminating a near-interference. In FIG. 9, with respect to the bit error rate of $10^{-3}$, when the optimum threshold value y by the simulation test was applied, an effect of SINR reduction of about 16 dB was acquired. Also, when the optimum threshold value γ by the mathematical analysis was applied, an effect of SINR reduction of about 18 dB was acquired.

A reduction of SINR may signify a reduction of transmitted/received power. Thus, according to the present invention, power consumption may be greatly reduced. Specifically, since the present invention may be applicable to an ad-hoc network which includes nodes operating with a limited power supply source, such as a battery, the above-described power consumption reduction effect may become more important.

FIG. 10 is a graph illustrating a performance curve when 36 interferers are located around a perimeter of about 10 meters from a receiver. The graph of FIG. 10 shows a performance enhancement effect when a far-interference is dominant.

Referring to FIG. 10, when the present invention is applied, a performance enhancement effect does not have much difference in comparison to the conventional art. The result designates that a near-interference is insignificant since the interferers are away from the receiver. Also, the result shows that the near-interference is a significant performance deterioration factor.

FIG. 11 is a graph illustrating a performance curve when 100 interferers are regularly distributed within a range of about 10 meters from a receiver. Thus, the graph of FIG. 11 shows a result of effect by both the near-interference and the far-interference. A substantial performance enhancement effect can be seen through the graph illustrated in FIG. 11.

Referring to FIG. 11, when the optimum threshold value γ by the mathematical analysis or simulation test is applied, a data receiving performance is enhanced in comparison to the conventional method. When a technology of determining and eliminating a near-interference signal based on the optimum threshold value γ is applied, SINR is reduced about 12 dB with respect to the bit error rate of $10^{-3}$ in comparison to the conventional method not using the above-described technology. In this instance, reduction of SINR also signifies a reduction of power consumption.

According to the present invention, a method is provided for an UWB wireless communication system in a multi-user environment, and can solve a near/far problem, and also can be readily embodied.

According to the present invention, it is possible to effectively eliminate an effect of a near-interference by determining a correlation value greater than a predetermined threshold value. A correlation value greater than a predetermined threshold value may then be designated as a near-interference signal and disregarded in a bit decision by the receiver.

Also, according to the present invention, it is possible to provide a new criterion for determining a threshold value. Specifically, the present invention provides a method for determining an optimum threshold value by using a predetermined number of times that each of the plurality of pulse signals is transmitted, and a signal-to-interference-and-noise ratio (SINR), and also using an estimated ratio of a near-interference amount to a far-interference amount or a ratio of signal pulses affected by a near-interference, from among a plurality of pulse signals.

Also, according to the present invention, it is possible to simplify a threshold value determination process by using a relation between the estimated ratio and the ratio of signal pulses affected by the near-interference.

Also, according to the present invention, it is possible to enable a quick bit decision by selecting and applying an optimum threshold value from a table that stores a pre-calculated threshold value with respect to a plurality of ratios of signal pulses affected by the near-interference and a plurality of SINRs within a predetermined range.

Also, according to the present invention, it is possible to reduce SINR for acquiring the same bit error rate. Here, a reduction of SINR generally signifies a reduction of transmitted/received power and thus, the present invention may be advantageous for a transceiver that operates with a limited power supply source. Also, according to the present invention, it is possible to provide an interference control method optimized for an ad-hoc network including the transceiver.

Also, according to the present invention, it is possible to secure high accuracy of transmitting/receiving data by significantly decreasing a bit error rate with respect to the same SINR, i.e. a transmitted/received power.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for eliminating interference in an Ultra-Wideband (UWB) wireless communication system, the method comprising:

receiving a plurality of signal pulses that are each transmitted a number of times;

calculating a correlation value by applying a correlation mask to a signal pulse;

acquiring a threshold value based on a near/far interference ratio and a near-interference pulse ratio of signal pulses; and eliminating the signal pulse when the correlation value is greater than the threshold value, wherein the near/far interference ratio comprises a ratio of a near-interference amount to a far-interference amount, the near-interference amount and the far-interference amount being comprised in the plurality of signal pulses, and wherein the near-interference pulse ratio comprises a value acquired by measuring a ratio of distorted signal pulses due to the near-interference among the signal pulses.

2. A method for receiving data in an Ultra-Wideband (UWB) wireless communication system, the method comprising:

receiving a plurality of signal pulses that are each transmitted a number of times;

calculating a plurality of correlation values by applying a correlation mask to each of the plurality of signal pulses;

summing the correlation values that have a value less than a threshold value; and detecting a bit corresponding to each signal pulse based on a result of the summing, wherein the threshold value is acquired based on a near/far interference ratio and a near-interference pulse ratio of signal pulses, wherein the near/far interference ratio comprises a ratio of a near-interference amount to a far-interference amount, the near-interference amount and the far-interference amount being comprised in the plurality of signal pulses, and wherein the near-interference pulse ratio comprises a value acquired by measuring a ratio of distorted signal pulses due to the near-interference among the signal pulses.

3. An apparatus for receiving data in an Ultra-Wideband (UWB) wireless communication system, the apparatus comprising:

a receiver to receive a plurality of signal pulses that are each transmitted a number of times;

a correlation unit to calculate a plurality of correlation values by applying a correlation mask to each signal pulse of the plurality of signal pulses;

a threshold value determinator to acquire a threshold value based on a near/far interference ratio and a near-interference pulse ratio of signal pulses;

a near-interference eliminator to eliminate the near-interference from the plurality of correlation values, the near-interference being a correlation value of the plurality of correlation values having a value greater than the threshold value; and a bit detector to sum the plurality of correlation values having a value that is not greater than the threshold value, and to detect a bit corresponding to each pulse signal, wherein the near/far interference ratio comprises a ratio of a near-interference amount to a far-interference amount, the near-interference amount and the far-interference amount being comprised in the plurality of signal pulses, and wherein the near-interference pulse ratio comprises a value acquired by measuring a ratio of distorted signal pulses due to the near-interference among the signal pulses.

* * * * *